US011854317B2

(12) United States Patent
Zerey et al.

(10) Patent No.: US 11,854,317 B2
(45) Date of Patent: Dec. 26, 2023

(54) METHOD AND SYSTEM FOR TYPING MOTOR VEHICLES

(71) Applicant: ZF Friedrichshafen AG, Friedrichshafen (DE)

(72) Inventors: Mazlum Zerey, Saarbrücken (DE); Christoph Kirst, Wadgassen (DE); Stefan Jochem, Voelklingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 360 days.

(21) Appl. No.: 17/415,006

(22) PCT Filed: Dec. 18, 2019

(86) PCT No.: PCT/EP2019/085823
§ 371 (c)(1),
(2) Date: Jun. 17, 2021

(87) PCT Pub. No.: WO2020/127402
PCT Pub. Date: Jun. 25, 2020

(65) Prior Publication Data
US 2022/0068054 A1 Mar. 3, 2022

(30) Foreign Application Priority Data
Dec. 20, 2018 (DE) .................... 10 2018 222 537

(51) Int. Cl.
*G07C 5/08* (2006.01)
(52) U.S. Cl.
CPC ......... *G07C 5/0816* (2013.01); *G07C 5/0841* (2013.01)
(58) Field of Classification Search
CPC .... G07C 5/0816; G07C 5/0841; G07C 5/008; F16H 2059/003
See application file for complete search history.

(56) References Cited

U.S. PATENT DOCUMENTS 9,053,593 B2   6/2015   Sugimoto et al.
9,159,177 B2   10/2015  Garcia Manchado
(Continued)

FOREIGN PATENT DOCUMENTS

CN   101516710 A   8/2009
CN   102046427 A   5/2011
(Continued)

OTHER PUBLICATIONS

International Search Report (English Translation) PCT/EP2019/085823, dated May 8, 2020. (2 pages).
(Continued)

*Primary Examiner* — Justin Holmes
(74) *Attorney, Agent, or Firm* — Dority & Manning, P.A.

(57) ABSTRACT

A method for standardizing a plurality of motor vehicles may include determining a characteristic value of an individual vehicle (50) based on transmission data for the individual vehicle from a data gathering device (6) associated with the individual vehicle. The transmission data for the individual vehicle may be associated with shifting characteristics of a transmission of the individual vehicle for at least one of an operation interval of the individual vehicle or a mileage of the individual vehicle. Additionally, the method may include assigning the individual vehicle to one of a plurality of profiles (10.1, 10.2, 10.3, 10.4, 10.5) of a classification (10) based at least in part on a magnitude of the characteristic value. The classification may be determined based at least in part on average values and a magnitude and frequency of deviations from the average values of transmission data gathered for a plurality of vehicles (5).

13 Claims, 1 Drawing Sheet

(56) References Cited

U.S. PATENT DOCUMENTS

| | | |
|---|---|---|
| 9,401,057 B2 | 7/2016 | Garrett et al. |
| 9,709,161 B2 | 7/2017 | Kim |
| 10,583,792 B2 | 3/2020 | List et al. |
| 2002/0077730 A1 | 6/2002 | Hardtle et al. |
| 2010/0063697 A1 | 3/2010 | Lindgren et al. |
| 2014/0278837 A1* | 9/2014 | Blumer .............. G06Q 30/0283 705/13 |
| 2015/0269790 A1* | 9/2015 | Batcheller .............. G07C 5/085 701/537 |
| 2015/0348058 A1* | 12/2015 | Liu .................... G06Q 30/0201 701/31.5 |
| 2016/0144865 A1 | 5/2016 | Stadler |
| 2017/0228946 A1 | 8/2017 | Tseng et al. |
| 2021/0215491 A1 | 7/2021 | Liu et al. |

FOREIGN PATENT DOCUMENTS

| | | |
|---|---|---|
| CN | 103562978 A | 2/2014 |
| CN | 104364827 A | 2/2015 |
| CN | 105339225 A | 2/2016 |
| CN | 105422839 A | 3/2016 |
| CN | 106536315 A | 3/2017 |
| CN | 108488375 A | 9/2018 |
| CN | 108885114 A | 11/2018 |
| DE | 3817495 A1 | 11/1989 |
| DE | 3817495 A1 | 11/1989 |
| DE | 10057972 A1 | 7/2002 |
| DE | 10327031 A1 | 1/2005 |
| DE | 102013204128 A1 | 9/2014 |
| DE | 112016006295 T5 | 11/2018 |
| EP | 2607144 A1 | 6/2013 |
| EP | 2607144 A1 | 6/2013 |
| WO | WO 2008/033079 A1 | 3/2008 |
| WO | WO 2014/206548 A2 | 12/2014 |
| WO | WO 2017/142536 A1 | 8/2017 |

OTHER PUBLICATIONS

Chinese Office Action (English Translation) 201980083798.1, dated Jul. 5, 2022. (11 pages).

* cited by examiner

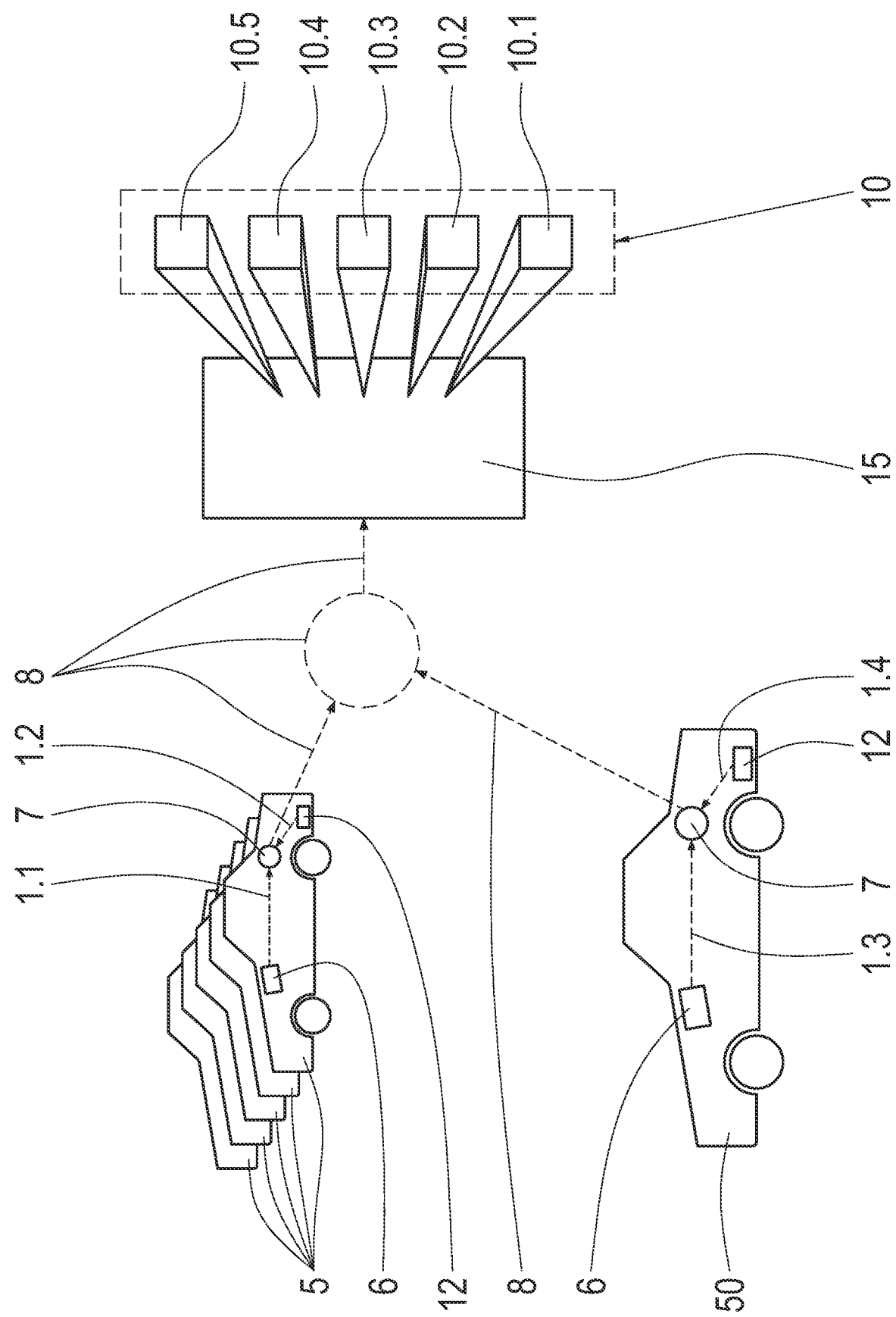

METHOD AND SYSTEM FOR TYPING MOTOR VEHICLES

CROSS-REFERENCE TO RELATED APPLICATION

The present application is related and has right of priority to German Patent Application No. 10 2018 222 537.0 filed on Dec. 20, 2018 and is a nationalization of PCT/EP2019/085823 filed in the European Patent Office on Dec. 18, 2019, both of which are incorporated by reference in their entirety for all purposes.

FIELD OF THE INVENTION

The invention relates to a method for standardizing, classifying, or typing motor vehicles. The invention further relates to a system for standardizing, classifying, or typing motor vehicles.

BACKGROUND

Using wireless communication paths or channels, it is possible to monitor individual vehicles and/or motor vehicles not only during a driving operation by utilizing existing sensor systems present in the vehicle and, in the process, gather condition or status data, but rather to also make the condition data available for a central evaluation and analysis via the existing communication paths. The evaluation and analysis takes place via a central computer at the vehicle manufacturer, for example, as described in EP 2 607 144 A1. By gathering vehicle condition data, in particular, settings or functions of the components installed in the vehicle detectable and, on the basis thereof, for example, instructions for the driver are derived. The knowledge of the technical settings in the vehicle are also of interest for the vehicle manufacturer or for suppliers of vehicle components.

SUMMARY OF THE INVENTION

The objective of the invention is to utilize the knowledge of the technical settings and functions, which are obtainable in the motor vehicle by monitoring exiting sensors, to a broader extent, in particular for the driver of the motor vehicle.

In order to build up a database, which is the basis for standardizing or typing individual motor vehicles, transmission data is metrologically gathered at a plurality of vehicles with transmissions installed therein. The transmission data is of relevance for shifting characteristics or behavior of the transmissions during real driving operations of the vehicles, i.e., for transmission settings and functions. A feature common to the vehicles utilized for the data gathering is that they are equipped with transmissions of the same type or at least with transmissions that are comparable with regard to their function.

The transmissions are preferably automatic transmissions. Automatic transmissions are set up for an average user group with respect to their shifting characteristics. Automatic variants are also offered, in which the driver selects between different automatic driving programs, for example, between a normal program, an environmentally-oriented shift program, which is focused on particularly fuel-efficient driving, and a sport program, which operates, for example, with shorter gear changes and at a generally higher engine speed.

Many vehicle owners do not utilize these options, however, but rather prefer "their" driving program in the daily driving practice. Against this background, the objective is to offer the individual driver a customized parameterization of the automatic transmission operating in his/her vehicle, i.e., a transmission control unit that corresponds to or accommodates the individual driving style of the particular driver.

In a database, preferably in a database of the vehicle manufacturer, a classification is stored on the basis of the data gathered in the field test, which includes appropriate profiles for certain groups of driver types, for example, for rather reserved drivers or for drivers who tend to prefer a rather sporty driving style. Each profile includes a combination of very specific transmission parameters that are characteristic for this profile. The transmission parameters include, for example, the shifting speed during the changeover from gear step to gear step of the transmission, or the minimum or maximum permissible rotational speed in the individual gear steps.

In order to create the classification, field tests are carried out with a plurality of motor vehicles, which are equipped with transmissions that are comparable at least with regard to their function. Using data gathering devices present in the vehicles of the field test, transmission data of the vehicles are metrologically gathered, for example, at an operation interval and/or a certain mileage. The term "transmission data" is understood, in this case, to be parameters of a mechanical or control-related type, which are of relevance for the real shifting characteristics, i.e., the shifting characteristics detected in the driving practice, of the particular transmission, within the scope of the driving situations of the field test.

The data gathering is carried out at an operation interval predefined as uniformly as possible for all vehicles of the field test and/or at a uniformly predefined mileage of the vehicles. This is the case because, in order to arrive at a sufficiently precise characterization of a vehicle type, a sufficiently large number of driving situations and, in particular, also different driving situations must be taken into account, during which the transmission data are gathered.

Therefore, the gathering of the transmission data preferably takes place not only at points, but rather at a predefined operation interval of sufficient length, or, alternatively, at a predefined mileage of the vehicle. If transmission data are gathered, for example, at a mileage of 5,000 km, it is assumed with a certain probability that the majority of the driving situations that are typical for this vehicle and for the driver of the vehicle has been taken into account, and so values are assumed to be reliable and characteristic for the vehicle and the driving style of the driver.

The transmission data gathered in this way from a large number of motor vehicles are transmitted to a central computer, for example, via telematics. The central computer is, for example, the server of the vehicle manufacturer or its transmission supplier. A data processing unit is an integral part of the central computer, which computes average values from the gathered transmission data as well as the size or magnitude of deviations from the average values and a frequency of the deviations from the average values.

A classification is created on the basis of the average values and the size and frequency of the deviations from the average values, which includes a standard profile and at least one further profile in addition to the standard profile.

The creation of the classification takes place, for example, automatically by the data processing unit, by an assessment carried out by a specialist, or corrected by a specialist.

Each profile of the classification is distinguished by indirectly virtually characterizing a certain type of driver and directly virtually characterizing a vehicle, which is moved in a certain, characteristic manner in the daily driving practice. In this way, for example, the standard profile virtually characterizes a vehicle that is driven by its driver primarily in a comfort-oriented manner. A vehicle of this type is usually moderately accelerated, decelerated early, and the driver tends to seldom fully utilize the gear steps of the transmission.

In addition to the standard profile, the classification contains at least one further profile. The further profile is, for example, a profile virtually characterizing a rather sporty driving style. A driving style of this type is characterized by a late upshift of the individual gear steps, an often intense acceleration, but also, deceleration of the vehicle, and, generally, driving with a higher-than-average engine speed.

A standardization of individual vehicles takes place on the basis of the database of different profiles. Standardization is understood to be the assignment of a single vehicle to one of the profiles of the classification.

In order to standardize or type a single vehicle, a data gathering device present in the vehicle gathers transmission data of the vehicle at a certain operation interval and/or at a certain mileage of the vehicle, provided these transmission data are of relevance for the actual shifting characteristics of the transmission at the operation interval and/or at the mileage. This data gathering is set up, with regard to the gathering criteria and the sensor systems utilized for gathering the transmission data, similarly to the data gathering utilized in the vehicles of the field test for building up the database and creating the classification.

In particular, the gathering of the transmission data takes place by sensor systems fixedly installed in the vehicle, for example, via appropriate receivers. The data gathered in this way is of direct or indirect significance in daily driving situations for the settings and the functions at the vehicle transmission of the vehicle to be standardized. This takes place, for example, by measuring the relative motion of transmission components with respect to one another, by measuring vibrations in the transmission, or by measuring acoustic variables or other properties of the components or assemblies of the transmission that are metrologically detectable during a driving operation.

The gathering of the transmission data takes place either in a load-dependent manner, for example, during or around the time of gear changes, or at shorter or longer time intervals and, thereby, periodically. It is also possible to continuously monitor the transmission, its assemblies or individual transmission functions while gathering correspondingly greater data volumes.

The transmission data gathered at the vehicle to be standardized are transmitted to a central computer or a cloud at the vehicle manufacturer or at the transmission supplier via existing communication paths, for example, via telematics. The transmission takes place as a data set made up of the gathered transmission data, an identifier specific for the particular vehicle, and position data. The assignment of the data to a specifically identifiable vehicle is important in order to also be able to assign certain components installed in the vehicle during the analysis and evaluation of the data.

The transmission and storage of the transmission data and also their evaluation take place together with the specific identifier for the individual vehicle from which the transmission data originate. This identifier or identification is, for example, a vehicle-specific digital code, if applicable, supplemented with a code that stands for the particular vehicle type or for the monitored component in the vehicle, i.e., for the transmission unit specifically installed in the vehicle.

A data processing unit computes at least one specific characteristic value for the individual vehicle from the transmission data and the position data by processor-based data analysis and assessment. The characteristic value and, preferably, further characteristic values is/are of such a type and size that, for the particular vehicle, its characteristic, typical transmission shifting practice is optimally characterized.

Starting from the size of the computed characteristic value or of the computed characteristic values, the data processing unit then carries out the standardization of the vehicle, in that the vehicle is assigned to one of the profiles of the classification as a function of the size of the at least one characteristic value.

In order to handle as many driver profiles as possible, the classification should also include a correspondingly large number of different profiles. With one embodiment, it is therefore provided that the classification includes, in addition to the standard profile, at least one further profile below the standard profile and one further profile above the standard profile.

The data processing unit is set up to process the vehicle position data in addition to the gathered transmission data during the determination of the characteristic value specific for the vehicle. The vehicle position data are derived from position signals and, in particular, GPS signals recorded at the operation interval or the mileage of the vehicle. Taking into account of the position data in addition to the transmission data considerably improves the determination of the characteristic value, since, when the traveled routes are known, the gathered transmission data and their relation to the real shifting characteristics at the operation interval and/or at the mileage are better assessed.

Preferably, the transmission data gathered in the vehicle include further data regarding one or more of:
load conditions in individual gear steps of the transmission;
temperatures;
gear changes, including their points in time;
an oil supply of the transmission;
vibrations or noises in transmission components; and/or
a mechatronic transmission control unit.

According to one example embodiment, the transmitting of the gathered transmission data from the individual vehicle to be standardized via the communication network to the data processing unit takes place via a telemetry module, with which the vehicle is equipped.

Preferably, the transmitting of the position data, for example, the GPS signals recorded in the vehicle over time, also takes place via the telemetry module arranged in the vehicle. The signals regarding the vehicle position are stored in the vehicle in a position data module.

Further data that are processed during the determination of the specific characteristic value for the vehicle are data regarding:
a type of drive installed in the vehicle;
a rated power of the drive installed in the vehicle;
traveled routes;
speed limits on the traveled routes; and/or
road surfaces on the traveled routes.

According to a further embodiment, the specific characteristic value for the particular vehicle is stored together with the identifier or identification assigned to the particular vehicle as a data set. An access to this data set is possible only with authorization, in order to rule out data misuse.

BRIEF DESCRIPTION OF THE DRAWINGS

An exemplary embodiment of the invention is explained in greater detail in the following with reference to the diagrammatic FIGURE, wherein identical or similar elements are labeled with the same reference character. The sole FIGURE shows a system diagram for a method for standardizing motor vehicles in accordance with aspects of the present subject matter.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A field test is carried out with a plurality of vehicles and/or motor vehicles 5 in order to build up a database. The motor vehicles 5 are equipped with transmissions, preferably automatic transmissions, that are comparable at least with regard to their function. Transmission data is metrologically gathered for the motor vehicles 5 by data gathering devices 6 present in the motor vehicles 5 being field tested. Transmission data in this sense is data relevant for real shifting characteristics, i.e., the shifting characteristics detected in the driving practice, of the transmissions that are installed in the motor vehicles 5 being field tested.

The measured data gathered by each of the data gathering devices 6 is transmitted via a data transfer 1.1 to a telemetry module 7 arranged in the respective motor vehicle 5. Moreover, signals regarding the vehicle position, for example, GPS signals, are transmitted from a position data module 12 via a data transfer 1.2 to the telemetry module 7.

The telemetry modules 7 communicate via a general or application-specific communication network 8 with a data processing unit 15. On this communication channel, not only is the transmission data gathered for respective vehicle 5 transmitted, but also a data set made up of the transmission data, the position data, and an identification assigned to the respective vehicle 5.

The data processing unit 15 computes average values, the size or magnitude of deviations from the average values, and a frequency of the deviations from the average values based at least in part on the transmission data transmitted via the communication network 8. Due to the plurality of vehicles 5 involved in the field test, a large volume and variance of transmission data are gathered and are available for evaluation.

Based at least in part on the average values and the size and the frequency of the deviations from the average values, the vehicle manufacturer or the transmission supplier creates a classification 10 made up of profiles 10.1-10.5, possibly by utilizing the data processing unit 15. A classification that includes five profiles 10.1, 10.2, 10.3, 10.4, 10.5 is represented in the sole FIGURE.

A middle standard profile 10.3 represents rather average, for example, primarily comfort-oriented shifting characteristics. Another one of the profiles 10.1, 10.2, 10.4, 10.5 represents a driving style that takes clearly environmental aspects into account and is distinguished, for example, by particularly fuel-efficient driving. Yet another one of the profiles 10.1, 10.2, 10.4, 10.5 represents sports-oriented shifting characteristics of the transmission, for example, having relatively short gear changes and a generally higher engine speed.

The classification 10 having different profiles 10.1, 10.2, 10.3, 10.4, 10.5 offers the precondition of standardizing new, individual vehicles and/or motor vehicles. A further or individual vehicle 50 of this type is represented in the drawing. It is also set up to metrologically gather transmission data, via a data gathering device 6 present in the individual vehicle 50, the transmission data being of relevance for the real shifting characteristics of the transmission in the driving practice. Via the telemetry module 7 of the individual vehicle 50, the transmission data of the individual vehicle 50 and position data of the position data module 12, for example, GPS data, are transmitted to the data processing unit 15 via a particular data transfer 1.3, 1.4.

A processor of the data processing unit 15 computes at least one specific characteristic value for the individual vehicle 50 from the transmission data and position data. As a function of the size or magnitude of this characteristic value, the processor of the data processing unit carries out a data-based assignment of the individual vehicle 50 to one of the profiles 10.1, 10.2, 10.3, 10.4, 10.5 of the classification 10, i.e., the individual vehicle 50 is grouped into a certain profile and, thereby, standardized or typed, with respect to the band width of possible transmission characteristics represented by the classification.

The data transmission takes place via the communication network 8 and the data processing 15 takes place by utilizing a data set in order to unambiguously assign the transmission data and the position data to the particular individual vehicle 50 and, in fact, during the communication via the communication network 8 as well as within the scope of the data analysis in the processor of the data processing unit 15. The data set includes the transmission data, the position data, and an identifier that is specific, i.e., valid only for the particular individual vehicle 50 and, thereby, is unique.

The characteristic value computed by the processor of the data processing unit 15 is also stored together with the identifier assigned to the particular individual vehicle 50, as a data set. An access to this data set is possible only with prior authorization, in order to rule out data misuse.

The advantage of the method is the ability to offer the driver of the standardized vehicle 50 a parameterization of his/her vehicle transmission specifically matched to his/her vehicle 50. This option is offered to the driver, for example, as an upgrade service, in the form of a software package with change data of the electronic transmission control unit.

It is possible for the vehicle manufacturer or the transmission manufacturer to create driver profiles with an emphasis, for example, on reduced fuel consumption, a sporty driving style, or a sustainability-oriented driving style. Moreover, an efficiency-oriented transmission parameterization contributes to the achievement of low emissions of carbon dioxide and nitrogen oxides. Depending on the preferences of the individual driver, the success achieved with the specific transmission parameterization and/or change or adaptation of the transmission control unit is also, for example, increased comfort during driving.

Moreover, it is possible to better classify the causes of fault sources in vehicle transmissions. Due to the characteristic values computed on the basis of the transmission data via analysis, certain transmission problems are ruled out in the troubleshooting, which helps to save time for technical analyses.

It is advantageous to initially offer the adaptation of the transmission control unit according to the determined profile to the driver of the particular vehicle 50 on a trial basis, in that, for example, appropriate transmission parameters are transferred to the electronic transmission control unit of the vehicle 50 and programmed therein. If, after a certain test phase, the driver does not perceive the hoped-for or desired effect, the standard configuration is reset by changing the transmission control again.

The gathered transmission data is also utilized by the manufacturer to optimize the transmission for its further production and, for example, to adapt it to further or new market requirements.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1.1 data transfer
1.2 data transfer
1.3 data transfer
1.4 data transfer
5 motor vehicle
6 data gathering device
7 telemetry module
8 communication network
12 position data module
15 data processing unit
10 classification
10.1 profile
10.2 profile
10.3 profile
10.4 profile
10.5 profile
50 vehicle

The invention claimed is:

1. A method for standardizing a plurality of motor vehicles, the method comprising:
determining, with a data processing unit (15), average values, a magnitude of deviations from the average values, and a frequency of the deviations from the average values based at least in part on transmission data from data gathering devices (6) of a plurality of motor vehicles (5) equipped with transmissions of comparable function, the transmission data being indicative of shifting characteristics of the transmissions during real driving operations;
determining, with the data processing unit (15), a characteristic value of an individual vehicle (50) based at least in part on transmission data for the individual vehicle (50) from an individual data gathering device (6) associated with the individual vehicle (50), the transmission data for the individual vehicle (50) being associated with actual shifting characteristics of a transmission of the individual vehicle (50) for at least one of an operation interval of the individual vehicle (50) or a mileage of the individual vehicle (50); and
assigning, with the data processing unit (15), the individual vehicle (50) to one of a plurality of profiles (10.1, 10.2, 10.3, 10.4, 10.5) of a classification (10) based at least in part on a magnitude of the characteristic value, the classification (10) being determined based at least in part on the average values and the magnitude and frequency of the deviations from the average values, the plurality of profiles of the classification (10) including a standard profile (10.3) and at least one further profile (10.1, 10.2, 10.4, 10.5).

2. The method of claim 1, wherein the at least one further profile comprises a lower profile (10.1, 10.2) below the standard profile (10.3), and a higher profile (10.4, 10.5) above the standard profile (10.3).

3. The method of claim 1, wherein determining the characteristic value comprises determining the characteristic value based at least in part on the transmission data for the individual vehicle (50) and vehicle position data, the vehicle position data being derived from position signals recorded at the at least one of the operation interval of the individual vehicle (50) or the mileage of the individual vehicle (50).

4. The method of claim 3, further comprising receiving, with the data processing unit (15), the transmission data for the individual vehicle (50) via a telemetry module (7) of the individual vehicle (50).

5. The method of claim 4, further comprising receiving, with the data processing unit (15), the vehicle position data via the telemetry module (7).

6. The method of claim 1, wherein the transmission data for the individual vehicle (50) includes data regarding one or more of:
load conditions in individual gear steps of the transmission of the individual vehicle (50);
temperatures of the transmission of the individual vehicle (50);
gear changes and time instances of the gear changes for the transmission of the individual vehicle (50);
an oil supply of the transmission of the individual vehicle (50);
vibrations or noises in transmission components of the transmission of the individual vehicle (50); and
a mechatronic transmission control unit for the transmission of the individual vehicle (50).

7. The method of claim 1, wherein determining the characteristic value assigned to the individual vehicle (50) comprises determining the characteristic value assigned to the individual vehicle (50) based at least in part on the transmission data for the individual vehicle (50) and one or more of data regarding:
a type of drive installed in the individual vehicle;
a rated power of the drive installed in the individual vehicle;
traveled routes;
speed limits on the traveled routes; and
road surfaces on the traveled routes.

8. The method of claim 1, further comprising storing the characteristic value assigned to the individual vehicle (50) with an identification assigned to the individual vehicle (50) as a data set.

9. A system for standardizing a plurality of motor vehicles (5), the plurality of motor vehicles (5) being equipped with transmissions with comparable function, the system comprising:
- data gathering devices (6) of the plurality of motor vehicles (5), the data gathering devices (6) metrologically gathering transmission data indicative of shifting characteristics of the transmissions of the plurality of motor vehicles (5) during real driving operations; and
- a data processing unit (15) configured to
  - determine average values, a magnitude of deviations from the average values, and a frequency of the deviations from the average values based at least in part on the transmission data from the data gathering devices (6),
  - determine a characteristic value of an individual vehicle (50) based at least in part on transmission data for the individual vehicle (50) from an individual data gathering device (6) associated with the individual vehicle (50), the transmission data for the individual vehicle (50) being associated with actual shifting characteristics of a transmission of the individual vehicle (50) for at least one of an operation interval of the individual vehicle (50) or a mileage of the individual vehicle (50), and
  - assign the individual vehicle (50) one of a plurality of profiles (10.1-10.5) of a classification (10) based at least in part on a magnitude of the characteristic value, the classification (10) being determined based at least in part on the average values, the magnitude of the deviations from the average values, and the frequency of the deviations from the average values, the plurality of profiles of the classification (10) including a standard profile (10.3) and at least one further profile (10.1, 10.2, 10.4, 10.5).

10. The system of claim 9, wherein the data processing unit (15) is configured to determine the characteristic value assigned to the individual vehicle (50) based at least in part on the transmission data for the individual vehicle (50) and vehicle position data, the vehicle position data being derived from position signals recorded at the at least one of the operation interval of the individual vehicle (50) or the mileage of the individual vehicle (50).

11. The system of claim 10, wherein the data processing unit (15) is configured to receive the transmission data from the individual vehicle (50) via a telemetry module (7) of the individual vehicle (50).

12. The system of claim 11, wherein the data processing unit (15) is configured to receive the vehicle position data via the telemetry module (7).

13. The system of claim 9, wherein the data processing unit (15) is further configured to store the characteristic value assigned to the individual vehicle (50) with an identification assigned to the individual vehicle (50) as a data set.

* * * * *